(12) United States Patent
Watazu

(10) Patent No.: US 11,972,081 B2
(45) Date of Patent: Apr. 30, 2024

(54) ELECTROSTATIC CAPACITANCE-TYPE PRESSURE SENSOR

(71) Applicant: NISSHA CO., LTD., Kyoto (JP)

(72) Inventor: Yuji Watazu, Kyoto (JP)

(73) Assignee: NISSHA CO., LTD., Kyoto (JP)

( * ) Notice: Subject to any disclaimer, the term of this patent is extended or adjusted under 35 U.S.C. 154(b) by 0 days.

(21) Appl. No.: 18/015,588

(22) PCT Filed: Oct. 29, 2021

(86) PCT No.: PCT/JP2021/039985
§ 371 (c)(1),
(2) Date: Jan. 11, 2023

(87) PCT Pub. No.: WO2022/123949
PCT Pub. Date: Jun. 16, 2022

(65) Prior Publication Data
US 2023/0251749 A1    Aug. 10, 2023

(30) Foreign Application Priority Data

Dec. 11, 2020 (JP) ................. 2020-205501

(51) Int. Cl.
*G06F 3/044* (2006.01)
*G06F 3/041* (2006.01)

(52) U.S. Cl.
CPC .......... *G06F 3/0445* (2019.05); *G06F 3/0412* (2013.01); *G06F 2203/04103* (2013.01)

(58) Field of Classification Search
CPC .... G06F 3/0446; G06F 3/0447; G06F 3/0412; G06F 2203/04103; G06F 2203/04105;
(Continued)

(56) References Cited

U.S. PATENT DOCUMENTS

| 11,099,095 B2 | 8/2021 | Tu et al. |
| 2007/0128948 A1* | 6/2007 | Nakanishi ............... G06F 3/045 439/660 |

(Continued)

FOREIGN PATENT DOCUMENTS

| CN | 108760102 A | 11/2018 |
| JP | 2020046375 A | 3/2020 |
| JP | 2020046387 A | 3/2020 |

OTHER PUBLICATIONS

International Search Report for PCT/JP2021/039985 dated Jan. 18, 2022.
(Continued)

*Primary Examiner* — Koosha Sharifi-Tafreshi
(74) *Attorney, Agent, or Firm* — Millen, White, Zelano & Branigan P.C.; William F. Nixon

(57) ABSTRACT

A capacitive pressure sensor is disclosed. The capacitive pressure sensor includes a first electrode sheet, a second electrode sheet, an elastic body layer formed by a foam sheet in which air bubbles having an average air bubble diameter of 2 to 40 μm are dispersed and sandwiched between the first electrode sheet and the second electrode sheet, and adhesive layers, one adhesive layer being formed on a surface of the elastic body layer on a side of the first electrode sheet and another adhesive layer being formed on a surface of the elastic body layer on a side of the second electrode sheet.

17 Claims, 1 Drawing Sheet

(58) Field of Classification Search
CPC ...... G06F 3/0445; G06F 3/041; G06F 3/0443; G06F 1/1652; G06F 2203/04106; G06F 2203/04112; G06F 3/0202; G06F 3/04144; G06F 3/04166; G06F 3/044; G06F 3/045; G01L 1/142; G01L 1/146; G01L 1/20; G01L 1/26; G01L 5/228; G01L 9/02; G01L 9/12

See application file for complete search history.

(56) References Cited

U.S. PATENT DOCUMENTS

| | | | |
|---|---|---|---|
| 2013/0098668 A1* | 4/2013 | Kim | G06F 3/041 977/734 |
| 2015/0277626 A1* | 10/2015 | Shinkai | G06F 3/0447 345/174 |
| 2016/0179259 A1* | 6/2016 | Watanabe | G06F 3/0446 345/174 |
| 2017/0199095 A1* | 7/2017 | Shere | G01L 9/12 |
| 2018/0196548 A1* | 7/2018 | Kim | G06F 3/0443 |
| 2019/0255805 A1* | 8/2019 | Han | B32B 27/065 |
| 2019/0353548 A1 | 11/2019 | Tu et al. | |
| 2021/0278300 A1* | 9/2021 | Bao | B25J 13/084 |
| 2022/0042866 A1* | 2/2022 | Mori | G01L 1/146 |

OTHER PUBLICATIONS

English Abstract of JP2020046387, Publication Date: Mar. 26, 2020.
English Abstract of JP2020046375, Publication Date: Mar. 26, 2020.
English Abstract of CN108760102, Publication Date: Nov. 6, 2018.

\* cited by examiner

ELECTROSTATIC CAPACITANCE-TYPE PRESSURE SENSOR

TECHNICAL FIELD

The present invention relates to a pressure sensor, and particularly relates to a capacitive pressure sensor that allows sufficiently obtaining an adhesive force of an adhesive layer with respect to an elastic body layer made of foam sheet.

BACKGROUND ART

In recent years, there has been proposed a pressure sensor incorporated into various electronic devices, such as smartphones, tablet terminals, mobile phones, notebook PCs, portable game machines, electronic dictionaries, TV devices, car navigation systems, and on-board display panels for use. The pressure sensor detects a pressing force input to an operation surface and performs any given operation.

For example, Patent Document 1 discloses a capacitive pressure sensor that includes a first electrode sheet in which first electrode layers are formed on a first insulating sheet, a second electrode sheet in which second electrode layers are formed on a second insulating sheet, and an elastic body layer sandwiched between the first electrode sheet and the second electrode sheet. When the first electrode sheet or the second electrode sheet is pressed, the capacitive pressure sensor detects a pressing force based on a capacitance change between the first electrode layer and the second electrode layer according to a distance change between the first electrode layer and the second electrode layer.

CITATION LIST

Patent Literature

Patent Document 1: JP 2018-22225 A

SUMMARY OF INVENTION

Technical Problem

However, in the capacitive pressure sensor having the configuration described above, when a foam sheet was used as the material of the elastic body layer, even when adhesive layers were provided on surfaces of the elastic body layer on the first electrode sheet side and on the second electrode sheet side, an adhesive force of the adhesive layers with respect to the elastic body layer failed to be sufficiently obtained in some cases.

In this case, there may be a case where the electrode sheet partially peels off from the elastic body layer, and electrodes on the electrode sheet on the pressing side do not integrally move along deformation of the elastic body layer, and therefore the pressure sensor cannot accurately detect the pressure.

Therefore, an object of the present invention is to provide a capacitive pressure sensor that allows sufficiently obtaining an adhesive force of an adhesive layer with respect to an elastic body layer made of foam sheet.

Solution to Problem

Some aspects will be described below as means to solve the problems. These aspects can be combined arbitrarily as necessary.

A capacitive pressure sensor according to the present invention includes a first electrode sheet, a second electrode sheet, an elastic body layer, and adhesive layers. In the first electrode sheet, a first electrode layer is formed on a first insulating sheet. In the second electrode sheet, a second electrode layer is formed on a second insulating sheet. The elastic body layer is formed by a foam sheet in which air bubbles having an average air bubble diameter of 2 to 40 μm are dispersed and sandwiched between the first electrode sheet and the second electrode sheet. One of the adhesive layers is formed on a surface of the elastic body layer on a side of the first electrode sheet and another of the adhesive layers is formed on a surface of the elastic body layer on a side of the second electrode sheet.

The present inventor considered that a low adhesive force of the adhesive layers of the prior art with respect to the elastic body layer was caused by the large number of open air bubbles on the surface of the foam sheet constituting the elastic body layer. In other words, the open air bubbles on the surface of the elastic body layer are inlets where an adhesive of the adhesive layer before curing penetrates the elastic body layer, and the penetration of the adhesive of the adhesive layer into the elastic body layer from the inlets thins the film thickness of the entire adhesive layer by the amount. As a result, the adhesive force of the adhesive layer with respect to the elastic body layer cannot be sufficiently obtained.

Therefore, with the air bubbles of the foam sheet being the fine air bubbles having the average air bubble diameter of 2 to 40 μm, even when the air bubbles open on the surface of the elastic body layer, the film thickness of the entire adhesive layer is not thinned due to the penetration of the adhesive from the open air bubbles into the elastic body layer. Therefore, the adhesive force of the adhesive layer with respect to the elastic body layer is sufficiently obtained.

As a result, in the capacitive pressure sensor of the present invention, the electrode sheet does not partially peel off from the elastic body layer. Consequently, it does not happen that the electrodes on the electrode sheet on the pressing side do not integrally move along the deformation of the elastic body layer, and thus the pressure sensor can accurately detect the pressure.

In addition, a foam structure of the elastic body layer does not change due to the penetration of the adhesive of the adhesive layer into the elastic body layer and the elastic body layer performs the predetermined elastic deformation, and therefore obviously, a pressure sensor 1 can accurately detect the pressure.

As one aspect, 95% or more of the air bubbles preferably have an air bubble diameter of 50 μm or less.

According to the configuration described above, even when the air bubbles open on the surface of the elastic body layer, since the most air bubbles 41 among them do not drastically vary to be greater than the upper limit of the average air bubble diameter, the reduction in film thickness of the entire adhesive layer can be further suppressed, and the adhesive force of the adhesive layer with respect to the elastic body layer can be more reliably obtained.

As one aspect, $Vg/(Vp+Vg)$ in a surface layer region at a depth of 20 μm from a surface of the foam sheet is preferably smaller than a half of $Vg/(Vp+Vg)$ in an inner region deeper than the surface layer region of the foam sheet Vg: volume of gases in the air bubbles contained per unit volume Vp: volume of plastic contained per unit volume in a portion where the air bubbles are absent.

According to the configuration described above, the elastic body layer has a structure such that the surface of the foam sheet is covered with a film, and thus the penetration of the adhesive into the air bubbles does not occur.

Also, as one aspect, the air bubbles are preferably open cells.

When the air bubbles are closed cells, air in the air bubbles cannot escape when pressing input is performed, possibly resulting in a rupture of the air bubbles. When the air bubbles are ruptured, a present state of the air bubbles in the elastic body layer changes over time. That is, the degree of deformation of the elastic body layer during the pressing input changes, and sensitivity of the pressure sensor does not become constant.

In contrast, when the air bubbles are the open cells, the air in the air bubbles can escape when the pressing input is performed, so the rupture of the air bubbles can be avoided. Therefore, the present state of the air bubbles in the elastic body layer does not change over time, and the sensitivity of the pressure sensor can be maintained constant.

In addition, as one aspect, an adhesive used in the adhesive layer before curing preferably has a viscosity from 10 to 200 PaS.

According to the configuration described above, even when the air bubbles open on the surface of the elastic body layer, since the viscosity before curing is high, penetration of the adhesive from the open air bubbles into the elastic body layer can be suppressed. Therefore, the adhesive force of the adhesive layer with respect to the elastic body layer is sufficiently obtained.

Also, as one aspect, the adhesive is preferably a thermosetting adhesive.

According to the configuration described above, even with the electrode sheet having an opaque portion, the adhesive layer can be uniformly cured. The adhesive is also excellent in screen printability.

In addition, as one aspect, the foam sheet is preferably made of a silicone resin.

According to the configuration described above, restorability of the elastic body layer after the pressing is released is improved. In addition, a degree of deformation is less likely to vary due to, for example, a change in temperature during use of the pressure sensor, and the sensitivity of the pressure sensor can be maintained constant.

As one aspect, the foam sheet preferably has a thickness of 50 μm to 200 μm.

According to the configuration described above, the pressure sensor having sufficient sensitivity can be obtained.

Advantageous Effects of Invention

The pressure sensor of the present invention allows sufficiently obtaining the adhesive force of the adhesive layer with respect to the elastic body layer made of the foam sheet.

DESCRIPTION OF EMBODIMENTS

Figure 1:
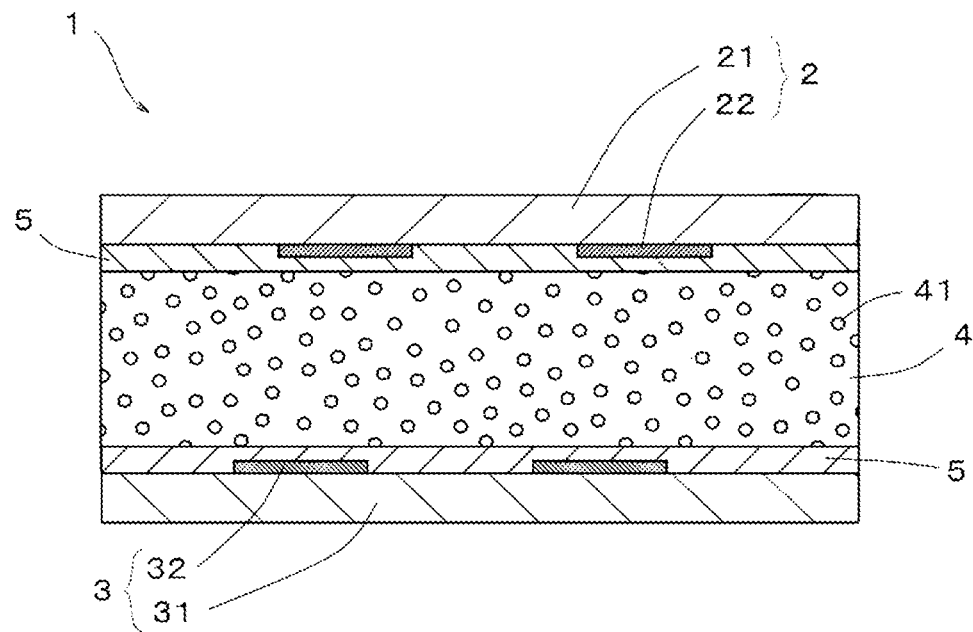
FIG. 1 is a cross-sectional view illustrating an example of a pressure sensor of the present invention.

A capacitive pressure sensor of the present invention is described below based on the drawings. Note that the drawings provided related to the present invention are schematically drawn for ease of understanding. Also, a part that overlaps with the drawing previously described in the description of each drawing may be partially omitted or simplified for ease of understanding of the drawing.

(1) Basic Structure and Detection Principle of Pressure Sensor

A pressure sensor 1 includes a first electrode sheet 2 in which first electrode layers 22 are formed on a first insulating sheet 21, a second electrode sheet 3 in which second electrode layers 32 are formed on a second insulating sheet 31, an elastic body layer 4 formed by a foam sheet and sandwiched between the first electrode sheet 2 and the second electrode sheet 3, and adhesive layers 5, 5, one of the adhesive layers being formed on a surface of the elastic body layer 4 on a side of the first electrode sheet 2 and another of the adhesive layers being formed on a surface of the elastic body layer 4 on a side of the second electrode sheet 3 (see FIG. 1).

In the example of the pressure sensor 1 illustrated in FIG. 1, on the second electrode sheet 3, the elastic body layer 4 and the first electrode sheet 2 are stacked in this order.

The pressure sensor 1 configured as described above is, for example, placed on a glass plate covering a display surface of a display device to be used as a capacitive pressure sensor.

The detection principle is as follows. That is, vertical application of a pressure to the first electrode sheet 2 serving as the front surface as a pressing force deforms the elastic body layer 4 in the vertical direction, causes the first electrode layers 22 of the first electrode sheet 2 to approach the second electrode layers 32 of the second electrode sheet 3, and decreases a distance between the electrodes. Since a capacitance is inversely proportional to the distance between the electrodes, the capacitance increases. By measuring and converting the increase amount of capacitance, the pressure in the thickness direction of the pressure sensor 1 can be detected.

Furthermore, the pressing force may be a shear force acting in a direction parallel to the horizontal surface of the pressure sensor 1.

For example, when the application is shear force detection of a tire, the pressure sensor 1 is placed on a road surface directly or indirectly via a hard plate for use.

The detection principle is as follows. That is, when the shear force is applied as the pressing force in the direction parallel to the horizontal plane of the first electrode sheet 2 serving as the front surface, the elastic body layer 4 deforms such that the first electrode sheet 2 moves in the horizontal direction. As a result, when the first electrode layer 22 moves, the overlapping area between the first electrode layer 22 of the first electrode sheet 2 and the second electrode layer 32 of the second electrode sheet 3 changes. The overlapping area of the electrodes increases in the direction same as that of the shear force and decreases in the reverse direction. Because the capacitance is proportional to the overlapping area of the electrodes, the capacitance increases or decreases. The direction of the shear force is determined by the increase or decrease in the capacitance, and the capacitance of the electrodes in the reverse direction is subtracted from the capacitance of the electrodes in the direction of force, thus ensuring detecting the shear force of the pressure sensor 1.

(2) First Electrode Sheet

As described above, in the first electrode sheet 2, the first electrode layers 22 are formed on the first insulating sheet

21. In the example illustrated in FIG. 1, the lower surface of the first insulating sheet 21, that is, the surface on the elastic body layer 4 side serves as the formation surface of the first electrode layer 22.

The first insulating sheet 21 supports the first electrode layer 22.

The material of the first insulating sheet 21 is not particularly limited, but examples thereof include a polyethylene terephthalate resin (PET), a urethane resin, and a silicone resin.

Examples of the material of the first electrode layer 22 are not particularly limited and include not only a metal film of, for example, gold, silver, copper, platinum, palladium, aluminum, or rhodium, but also a conductive paste film obtained by dispersing metal particles of these materials in a resin binder or an organic semiconductor of polyhexylthiophene, polydioctylfluorene, pentacene, and tetrabenzoporphyrin.

A method for manufacturing the first electrode layer 22 in the former case includes a method in which the entire surface of a conductive film is formed by, for example, a plating method, a sputtering method, a vacuum deposition method, or an ion plating method and is thereafter patterned by etching. An example of a method for manufacturing the first electrode layer 22 in the latter case includes a method in which the first electrode layer 22 is directly patterned by a printing method, such as screen printing, gravure printing, or offset printing.

The first electrode layer 22 may be only a single layer or may be formed from multilayers of two or more layers.

The pattern of the first electrode layer 22 may have any shape, such as a round shape, an angular shape, or a linear shape.

Preferably, the thickness of the first electrode layer 22 is selected in a range from 0.1 µm to 100 µm as appropriate.

A wiring pattern is connected from each of the first electrode layers 22 and is electrically connected to an external controller.

(3) Second Electrode Sheet

As described above, in the second electrode sheet 3, the second electrode layers 32 are formed on the second insulating sheet 31. In the example illustrated in FIG. 1, the upper surface of the second insulating sheet 31, that is, the surface on the elastic body layer 4 side serves as the formation surface of the second electrode layer 32.

The second insulating sheet 31 supports the second electrode layer 32.

The material of the second insulating sheet 31 is not particularly limited, but examples thereof include a polyethylene terephthalate resin (PET), a urethane resin, and a silicone resin.

Examples of the material of the second electrode layer 32 are not particularly limited and includes not only a metal film of, for example, gold, silver, copper, platinum, palladium, aluminum, or rhodium, but also a conductive paste film obtained by dispersing metal particles of these materials in a resin binder and an organic semiconductor of polyhexylthiophene, polydioctylfluorene, pentacene, or tetrabenzoporphyrin.

A method for manufacturing the second electrode layer 32 in the former case includes a method in which the entire surface of a conductive film is formed by, for example, a plating method, a sputtering method, a vacuum deposition method, or an ion plating method and is thereafter patterned by etching. An example of a method for manufacturing the second electrode layer 32 in the latter case includes a method in which the second electrode layer 32 is directly patterned to be formed by a printing method, such as screen printing, gravure printing, or offset printing.

The second electrode layer 32 may be only a single layer or may be formed from multilayers of two or more layers.

The pattern of the second electrode layer 32 may have any shape, such as a round shape, an angular shape, or a linear shape. Note that in the case of application for vertical pressure detection, the overlapping area of the first electrode layer 22 and the second electrode layer 32 is not critical, and thus one or both of the first electrode layer 22 and the second electrode layer 32 may be entirely formed.

Preferably, the thickness of the second electrode layer 32 is selected in a range from 0.1 µm to 100 µm as appropriate.

A wiring pattern is connected from each of the second electrode layers 32 and is electrically connected to an external controller. The pressing force applied to the pressure sensor 1 can be calculated by detecting the change in capacitance value generated between the first electrode layer 22 and the second electrode layer 32.

(4) Elastic Body Layer

In the pressure sensor 1 of the present invention, in the foam sheet constituting the elastic body layer 4, the air bubbles 41 having the average air bubble diameter of 2 to 40 µm are dispersed. The air bubbles 41 are significantly fine compared with the air bubbles having the average air bubble diameter of 100 to 1000 µm dispersed in the foam sheet constituting the elastic body layer 4 in the conventional pressure sensor.

Note that the average air bubble diameter of the foam sheet can be obtained by a method, such as image processing of a cross-sectional image obtained by cross-sectional observation.

The cross-sectional observation generally employs a method of opening a cross-section by cutting a sample and observing the cross-section by an optical microscope or a scanning electron microscope. Commercially available image processing software can be used. Alternatively, the air bubble diameter may be measured manually with the cross-sectional photograph for calculation. In the case where the cross-section is elliptical, a square root of a product of a major axis and a minor axis may be treated as the air bubble diameter.

Here, multiple locations were observed at in the thickness direction.

In the pressure sensor 1 of the present invention, even when the average air bubble diameter of the foam sheet constituting the elastic body layer 4 is fined to be 2 to 40 µm to open the air bubbles 41 on the surface of the elastic body layer 4, the film thickness of the entire adhesive layer 5, 5 does not excessively thin due to penetration of the adhesive of the adhesive layer 5, 5 before curing from the open air bubbles 41 into the elastic body layer 4. Therefore, the adhesive force of the adhesive layer 5, 5 with respect to the elastic body layer 4 is sufficiently obtained.

As a result, in the pressure sensor 1, the electrode sheet 2, 3 does not partially peel off from the elastic body layer 4. Consequently, it does not happen that electrodes 22 on the electrode sheet 2 on the pressing side do not integrally move along the deformation of the elastic body layer 4, and thus the pressure sensor 1 can accurately detect the pressure.

In addition, a foam structure of the elastic body layer 4 does not change due to the penetration of the adhesive of the adhesive layer 5, 5 to the elastic body layer 4 and the elastic body layer 4 performs the predetermined elastic deformation, and therefore obviously, the pressure sensor 1 can accurately detect the pressure.

When the average air bubble diameter is greater than 40 μm, the adhesive penetrates into the air bubbles 41 opening on the surface of the elastic body layer 4 to excessively thin the entire film thickness of the entire adhesive layer 5, 5, thus failing to sufficiently obtain the adhesive force of the adhesive layer 5, 5 with respect to the elastic body layer 4. The average air bubble diameter of less than 2 μm makes it difficult to cause sufficient deformation in accordance with the pressing force. More preferably, the average air bubble diameter is from 6 to 25 μm and further preferably, the average air bubble diameter is from 6 to 12 μm.

Note that 95% or more of the dispersed air bubbles 41 preferably have the air bubble diameter of 50 μm or less in the foam sheet containing the air bubbles 41 having the above-described average air bubble diameter.

In other words, even when the air bubbles 41 open on the surface of the elastic body layer 4, since the most air bubbles 41 among them do not drastically vary to be greater than the upper limit of the average air bubble diameter, the reduction in film thickness of the entire adhesive layer 5, 5 can be further suppressed, and the adhesive force of the adhesive layer 5, 5 with respect to the elastic body layer 4 can be more reliably obtained.

In the pressure sensor 1 of the present invention, Vg/(Vp+Vg) in a surface layer region at a depth of 20 μm from the surface of the foam sheet constituting the elastic body layer 4 is preferably smaller than a half of Vg/(Vp+Vg) in an inner region deeper than the surface layer region of the foam sheet.

Note that Vg denotes a volume of gases in air bubbles contained per unit volume, and Vp denotes a volume of plastic contained per unit volume in a portion where air bubbles are absent. These volumes can be obtained by cross-sectional observation.

When the surface layer region meets the relationship described above, the elastic body layer 4 has a structure such that the surface of the foam sheet is covered with a film 42 (see FIG. 2), and thus the penetration of the adhesive of the adhesive layer 5, 5 into the air bubbles 41 does not occur. Note that, in the drawing, the film 42 is a region from the surface of the elastic body layer 4 to the depth indicated by the dashed line, and the air bubbles in the film 42 are extremely fine, and therefore they are not illustrated.

Also, in the foam sheet constituting the elastic body layer 4 of the pressure sensor 1 of the present invention, the air bubbles 41 can be formed of closed cells, and the air bubbles 41 can be formed of open cells.

However, with the closed cells, each of the air bubbles 41 is confined in the film of the resin, and the internal air cannot escape or move. On the other hand, with the open cells, the air bubbles 41 are connected to one another, and the internal air can also move freely. Therefore, the formation by open cells are more preferable for the application of the pressure sensor 1.

Figure 2:
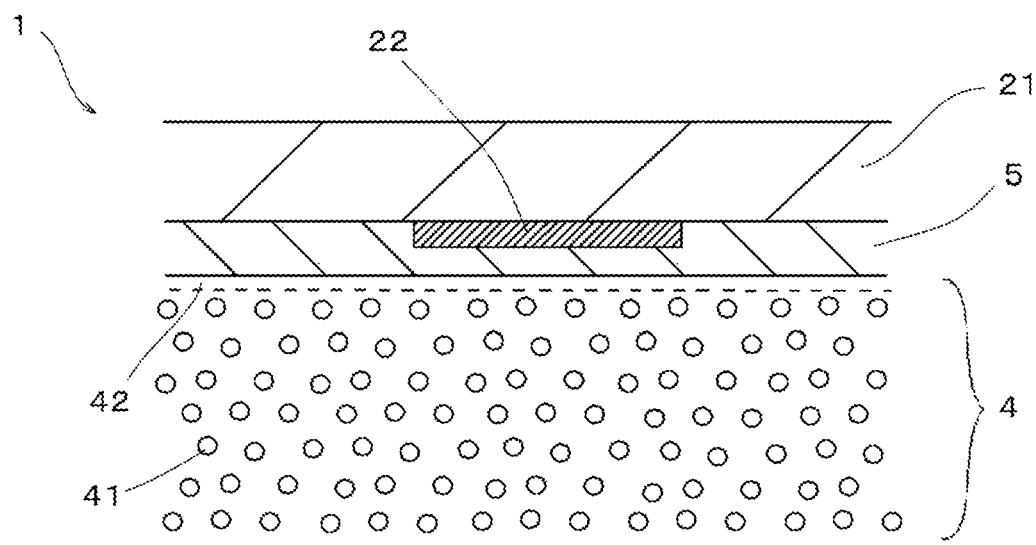
FIG. 2 is a cross-sectional view illustrating an example of a surface of an elastic body layer of the pressure sensor of the present invention.

Note that FIG. 1 and FIG. 2 schematically illustrate a foam sheet 4 and do not limit it to have closed cells.

That is, when the air bubbles 41 are closed cells, the air in the air bubbles 41 cannot escape when the pressing input is performed, possibly rupturing the air bubbles 41. When the air bubbles 41 are ruptured, the present state of the air bubbles 41 in the elastic body layer 4 changes over time. That is, the degree of deformation of the elastic body layer 4 during pressing input changes, and the sensitivity of the pressure sensor 1 does not become constant.

In contrast, when the air bubbles 41 are open cells, the air in the air bubbles 41 can escape when pressing input is performed, and thus rupture of the air bubbles 41 can be avoided. Therefore, the present state of the air bubbles 41 in the elastic body layer 4 does not change over time, and the sensitivity of the pressure sensor 1 can be maintained constant.

Also, as a material of the foam sheet constituting the elastic body layer 4, for example, a polyethylene resin, a silicone resin, and a urethane resin, and any various rubbers including a natural rubber and a synthetic rubber can be used.

Especially, the silicone resin is preferred because restorability of the elastic body layer 4 after the pressing is released is improved. Furthermore, the silicone resin is preferred because the degree of deformation of the elastic body layer 4 is less likely to vary due to, for example, the change in temperature during use of the pressure sensor 1, and the sensitivity of the pressure sensor 1 can be maintained constant.

A method for manufacturing the foam sheet includes manufacturing methods by molding methods, such as beads foaming, batch foaming, pressing foaming, secondary foaming under ordinary pressure, injection foaming, and extrusion foaming in which a thermally expandable microcapsule foaming agent obtained by enclosing a thermally decomposable foaming agent, such as azodicarbonamide or hydrogen carbonate, or, for example, fluorocarbons or hydrocarbon in a thermoplastic resin capsule is dispersed into the rein described above, and thus heat is applied.

The injection foaming among the molding methods described above can form a solid skin layer where the air bubble s 41 are absent in a portion in contact with a mold and form a foam core layer by the foam core layer being sandwiched by the solid skin layer. Thus, the injection foaming is suitable for a case in which the above-described elastic body layer 4 has a structure of covering the surface of the foam sheet with the film 42.

Additionally, the pressure sensor 1 of the present invention preferably has the thickness of the foam sheet constituting the elastic body layer 4 of 50 μm to 500 μm. It is more preferably to be from 50 μm to 200 μm.

(5) Adhesive Layer

The adhesive layers 5 are layers provided on surfaces of the elastic body layer 4 on the first electrode sheet 3 side and on the second electrode sheet 4 side to adhere the first electrode sheet 3 and the second electrode sheet 4 to the elastic body layer 4.

As described above, even when the air bubbles 41 open on the surface of the elastic body layer 4, it is necessary that the entire film thickness of the adhesive layer 5, 5 does not thin due to the penetration of the adhesive from the open air bubbles 41 to the elastic body layer 4 for sufficiently obtaining the adhesive force of the adhesive layer 5, 5 with respect to the elastic body layer 4. Therefore, the elastic body layer 4 is variously devised in "(4) elastic body layer" described above.

In addition to a thermosetting adhesive, a UV curable adhesive and a moisture-curable adhesive can be used as the adhesive layer 5. Especially, the thermosetting adhesive is preferably used.

This is because when the first electrode sheet 3 and the second electrode sheet 4 have opaque portions in, for example, an electrode and a wiring connected to the electrode, the UV curable adhesive has variation in curing of the adhesive layer 5. However, the thermosetting adhesive allows obtaining the uniform curing of the adhesive layer 5. The thermosetting adhesive also has excellent screen printability compared to the other adhesives.

Note that while heating is performed in curing of the thermosetting adhesive, the conventional foam sheet newly generates air bubbles between an adhesive layer and a foam body or in the adhesive layer by heating and sufficient adhesive force cannot be obtained. However, as in the pressure sensor 1 of the present invention, when the foam sheet constituting the elastic body layer 4 is the fine air bubbles 41 having the average air bubble diameter of 2 to 40 µm, an influence of thermal expansion of the air bubbles in the foam sheet is small and the new air bubbles are less likely to be generated between the adhesive layer and the foam body or in the adhesive layer, and thus the sufficient adhesive force is obtained.

Furthermore, viscosity before curing of the adhesive used in the adhesive layer 5 is preferably from 10 to 200 PaS.

When the viscosity before curing of the adhesive used in the adhesive layer 5 is less than 10 PaS, the adhesive penetrates from the air bubbles 41 opening on the surface of the elastic body layer 4 to the elastic body layer 4, and the thickness of the entire elastic body layer 4 is likely to thin. Furthermore, when the viscosity before curing of the adhesive used in the adhesive layer 5 is greater than 200 PaS, it is difficult to uniformly apply the adhesive over the adhesive surface. The viscosity is more preferably from 30 to 150 PaS.

For example, in the example illustrated in FIG. 1, each of the first electrode layer 22 is formed on the surface on the elastic body layer side of the first insulating sheet 21 and the second electrode layer 32 is formed on the surface on the elastic body layer side of the second insulating sheet 31, but the configuration is not limited thereto. One or both of the first electrode layer 22 and the second electrode layer 32 may be formed on the surface opposite to the elastic body layer side. The configuration is preferably the configuration illustrated in FIG. 1. This is because the change in capacitance between the first electrode layer 22 and the second electrode layer 32 when the elastic body layer 4 deforms is large.

Additionally, in the example illustrated in FIG. 1, the pressure sensor 1 only includes the first electrode sheet 2, the second electrode sheet 3, the elastic body layer 4 sandwiched between the first electrode sheet 2 and the second electrode sheet 3, and the adhesive layers 5, 5, one of the adhesive layers being formed on a surface of the elastic body layer 4 on the first electrode sheet 2 side and another of the adhesive layers being formed on a surface of the elastic body layer 4 on the second electrode sheet 3 side, but the configuration is not limited to this.

For example, a layer other than the elastic body layer 4 may be sandwiched between the first electrode sheet 2 and the second electrode sheet 3. For example, as a layer other than the elastic body layer 4, a foam sheet having a foaming magnification different from that of the elastic body layer 4 or a flexible sheet, such as an unfoamed gel, may be used. Note that the material of the adhesive layer formed on the surface on the side opposite to the elastic body layer 4 side of a layer other than the elastic body layer 4 is not limited to this.

INDUSTRIAL APPLICABILITY

The pressure sensor of the present invention can be incorporated into various electronic devices, such as smart phones, tablet terminals, mobile phones, notebook PCs, portable game machines, electronic dictionaries, TV devices, car navigation systems, and on-board display panels, robots, and FA devices for use. Also, the pressure sensor of the present invention is available in any field, such as industrial equipment, medical, health care, automobile, information terminal, and entertainment.

REFERENCE SIGNS LIST

1: Pressure sensor
2: First electrode sheet
21: First insulating sheet
22: First electrode
3: Second electrode sheet
31: Second insulating sheet
32: Second electrode
4: Elastic body layer
41: Air bubble
42: Film
5: Adhesive layer

The invention claimed is:

1. A capacitive pressure sensor, comprising:
a first electrode sheet in which a first electrode layer is formed on a first insulating sheet;
a second electrode sheet in which a second electrode layer is formed on a second insulating sheet;
an elastic body layer formed by a foam sheet in which air bubbles having an average air bubble diameter of 2 to 40 µm are dispersed and sandwiched between the first electrode sheet and the second electrode sheet; and
adhesive layers, one of the adhesive layers being formed on a surface of the elastic body layer on a side of the first electrode sheet and another of the adhesive layers being formed on a surface of the elastic body layer on a side of the second electrode sheet, wherein
when the first electrode sheet or the second electrode sheet is pressed, the capacitive pressure sensor detects a pressing force based on a capacitance change between the first electrode layer and the second electrode layer according to a distance change between the first electrode layer and the second electrode layer, and
wherein
$Vg/(Vp+Vg)$ in a surface layer region at a depth of 20 µm from a surface of the foam sheet is smaller than a half of $Vg/(Vp+Vg)$ in an inner region deeper than the surface layer region of the foam sheet, wherein
Vg refers to a volume of gases in the air bubbles contained per unit volume, and
Vp refers to a volume of plastic contained per unit volume in a portion where the air bubbles are absent.

2. The capacitive pressure sensor according to claim 1, wherein
95% or more of the air bubbles have an air bubble diameter of 50 µm or less.

3. The capacitive pressure sensor according to claim 1, wherein
the air bubbles are open cells.

4. The capacitive pressure sensor according to claim 1, wherein
an adhesive used in the adhesive layers before curing has a viscosity from 10 to 200 PaS.

5. The capacitive pressure sensor according to claim 1, wherein
a thermosetting adhesive is used for the adhesive layer.

6. The capacitive pressure sensor according to claim 1, wherein the foam sheet is made of a silicone resin.

7. The capacitive pressure sensor according to claim 1, wherein
the foam sheet has a thickness of 50 μm to 500 μm.

8. A capacitive pressure sensor, comprising:
a first electrode sheet in which a first electrode layer is formed on a first insulating sheet;
a second electrode sheet in which a second electrode layer is formed on a second insulating sheet;
an elastic body layer formed by a foam sheet in which air bubbles having an average air bubble diameter of 2 to 40 μm are dispersed and sandwiched between the first electrode sheet and the second electrode sheet; and
adhesive layers, one of the adhesive layers being formed on a surface of the elastic body layer on a side of the first electrode sheet and another of the adhesive layers being formed on a surface of the elastic body layer on a side of the second electrode sheet, wherein
the first electrode layer and the second electrode layer are made from one of metal films and conductive paste films,
when the first electrode layer and the second electrode layer are made from the conductive paste films, the first electrode layer and the second electrode layer are directly formed by a printing method, and
wherein
Vg/(Vp+Vg) in a surface layer region at a depth of 20 μm from a surface of the foam sheet is smaller than a half of Vg/(Vp+Vg) in an inner region deeper than the surface layer region of the foam sheet,
Vg refers to a volume of gases in the air bubbles contained per unit volume, and
Vp refers to a volume of plastic contained per unit volume in a portion where the air bubbles are absent.

9. The capacitive pressure sensor according to claim 8, wherein
the first electrode sheet and the second electrode sheet are pressed, the capacitive pressure sensor detects a pressing force based on a capacitance change between the first electrode layer and the second electrode layer according to a distance change between the first electrode layer and the second electrode layer.

10. The capacitive pressure sensor according to claim 8, wherein when the first electrode layer and the second electrode layer are made from metal films, the first electrode layer and the second electrode layer are formed on conductive films by one of a plating method, a sputtering method, a vacuum deposition method and an ion plating method, and are thereafter patterned by etching.

11. The capacitive pressure sensor according to claim 8, wherein
95% or more of the air bubbles have an air bubble diameter of 50 μm or less.

12. The capacitive pressure sensor according to claim 8, wherein
the air bubbles are open cells.

13. The capacitive pressure sensor according to claim 8, wherein
an adhesive used in the adhesive layers before curing has a viscosity from 10 to 200 PaS.

14. The capacitive pressure sensor according to claim 8, wherein
the foam sheet is made of a silicone resin.

15. The capacitive pressure sensor according to claim 8, wherein
the foam sheet has a thickness of 50 μm to 500 μm.

16. A method for manufacturing a capacitive pressure sensor, the method comprising:
making a first electrode sheet by forming a first electrode layer on a first insulating sheet;
making a second electrode sheet by forming a second electrode layer on a second insulating sheet;
making an elastic body layer formed by a foam sheet, in which air bubbles having an average air bubble diameter of 2 to 40 μm are dispersed in the elastic body layer;
applying adhesive layers on both sides of the elastic body layer to attach the elastic body layer between the first electrode sheet and the second electrode sheet, and wherein one of the adhesive layers is formed on a surface of the elastic body layer on a side of the first electrode sheet and another of the adhesive layers is formed on a surface of the elastic body layer on a side of the second electrode sheet;
wherein when the first electrode sheet or the second electrode sheet is pressed, the capacitive pressure sensor detects a pressing force based on a capacitance change between the first electrode layer and the second electrode layer according to a distance change between the first electrode layer and the second electrode layer, and
wherein
Vg/(Vp+Vg) in a surface layer region at a depth of 20 μm from a surface of the foam sheet is smaller than a half of Vg/(Vp+Vg) in an inner region deeper than the surface layer region of the foam sheet,
Vg refers to a volume of gases in the air bubbles contained per unit volume, and Vp refers to a volume of plastic contained per unit volume in a portion where the air bubbles are absent.

17. The method according to claim 16, wherein
the first electrode layer and the second electrode layer are made from one of metal films and conductive paste films,
for the metal films, the first electrode layer and the second electrode layer are formed on conductive films by one of a plating method, a sputtering method, a vacuum deposition method and an ion plating method, and are thereafter patterned by etching, and
for the conductive paste films, the first electrode layer and the second electrode layer are directly formed on a metal film by a printing method.

* * * * *